United States Patent [19]

Mutoh et al.

[11] Patent Number: 5,598,898
[45] Date of Patent: Feb. 4, 1997

[54] VEHICLE ANTITHEFT SYSTEM

[75] Inventors: Eiji Mutoh; Suguru Asakura; Akira Nagai, all of Saitama-ken, Japan

[73] Assignee: Honda Giken Kogyo Kabushiki Kaisha, Tokyo, Japan

[21] Appl. No.: 524,449

[22] Filed: Sep. 6, 1995

[30] Foreign Application Priority Data

Sep. 9, 1994 [JP] Japan .................................... 6-240878

[51] Int. Cl.⁶ ...................................................... B60R 25/00
[52] U.S. Cl. .............................................................. 180/287
[58] Field of Search ............................................... 180/287

[56] References Cited

U.S. PATENT DOCUMENTS

| | | | |
|---|---|---|---|
| 4,291,237 | 9/1981 | Kitano | 307/10 AT |
| 4,366,466 | 12/1982 | Lutz | 340/64 |
| 4,835,407 | 5/1989 | Kataoka et al. | 180/287 |
| 4,965,460 | 10/1990 | Tanaka et al. | 307/10.2 |
| 4,996,514 | 2/1991 | Sunami | 180/287 |
| 5,043,593 | 8/1991 | Tsutsumi et al. | 180/287 |
| 5,079,435 | 1/1992 | Tanaka | 180/287 |
| 5,229,648 | 7/1993 | Sues et al. | 180/287 |
| 5,491,470 | 2/1996 | Veligdan | 180/287 |

FOREIGN PATENT DOCUMENTS

| | | |
|---|---|---|
| 0372741 | 6/1990 | European Pat. Off. . |
| 0275789 | 6/1992 | European Pat. Off. . |
| 4234822 | 4/1993 | Germany . |
| 68912445 | 1/1994 | Germany . |
| 4240596 | 6/1994 | Germany . |
| 4313779 | 11/1994 | Germany . |
| 4416705 | 4/1995 | Germany . |
| 2046827 | 11/1980 | United Kingdom . |

*Primary Examiner*—Kenneth R. Rice
*Attorney, Agent, or Firm*—Pollock, Vande Sande & Priddy

[57] ABSTRACT

A vehicle antitheft system comprising an ID code compare unit for comparing a key ID code obtained from an ignition key with a reference ID code stored in advance in the vehicle and generating an enable signal when these ID codes are in a preset relationship (for example, both codes are identical), an engine ECU for receiving the enable signal and enabling control of the engine when the enable signal is correct and a delay times that is started in response to generation of the enable signal and generates a signal which enables starting of the motor starter after the lapse of a preset time period following the generation of the enable signal (for example, at least period necessary for the engine ECU to store or identify the enable signal).

5 Claims, 3 Drawing Sheets

5,598,898

VEHICLE ANTITHEFT SYSTEM

BACKGROUND OF THE INVENTION

1. Field of the Invention

The present invention is related to a vehicle ant/theft system, and particularly to a vehicle antitheft system in which a noise generated from a starter motor of an engine and fluctuations of a power source voltage due to starting of the starter motor are prevented from causing malfunction of the system.

2. Description of the Prior Art

In some of the various prior proposals for preventing the theft of a vehicle such as a car, the vehicle is prevented from being started or it is immobilized by mechanical and/or electrical means when it is attempted to be started or moved by using a wrong key. This is achieved by previously storing an identification code or a key ID code in a key, reading the key ID code when the key is inserted into a key cylinder to start the vehicle, comparing it with a reference ID code prestored in the vehicle, generating an enable signal and enabling the engine to be started up only when there is a match between both ID codes. In this case, since a theft may be committed by mechanical breakage or illegal wiring if the enable signal is a simple binary signal of on/off, the encoding of the enable signal has been proposed, for instance, in the "Car Technology", Vol. 48, No. 8, 1994, pp. 59–64.

An example of such a conventional transponder type immobilizer is shown in FIG. 4. FIG. 5 is a timing chart showing the operation of the device shown in FIG. 4. A key 2 includes a memory (not shown) in which a key ID code (for instance, of 64 bits) is prestored, and a transmitter 4 for transmitting the key ID code. The transmitter 4 in the key 2 and a key cylinder 5 are coupled together by, for instance, induction coils (antenna) 6. When the key 2 is inserted into the key cylinder and rotated to the ignition position, an ignition switch 7 is closed. In response to this, an immobilizerr CPU 13 operates, and an operating electric power is supplied from a power amplifier 11 of an immobilizer ECU 10 to the transmitter 4 through the coils (antenna) 6. The transmitter 4 responds to this to read the key ID code, and transmits it to the key cylinder 5 side.

The received key ID code is detected and digitized by a R/F (radio frequency) circuit 12 in the immobilizer 10, and read into the CPU 13 and temporarily stored in an appropriate ID code register 13B in the CPU 13. In an EEPROM 13A of the CPU 13, a unique reference ID code assigned to each vehicle is prestored, and the reference ID code and the key ID code which was read in are compared with each other by a compare unit 13S of the CPU 13. If it is determined that there is a match between the two or they are in a predetermined relationship, an enable signal is transmitted at t1, from the compare unit 13S to an engine control unit (ECU) 16. At the same time, a starter relay is activated to initiate the rotation of a starter motor (not shown) at t2.

When the ECU 16 completes the determination and verification of the reception of the enable signal at t3, it controls a fuel injection valve 17, a fuel pump 18, an ignition control unit 20, etc. according to a predetermined procedure and timing, thereby enabling the vehicle to start and run. On the other hand, if the reference ID code stored in the EEPROM 13A and the key ID code transmitted from the key 2 and read in do not match each other or they are not in a predetermined relationship, the compare function unit 13S does not issue an enable signal. Accordingly, the start of the vehicle by the ECU 16 is inhibited, and a horn 14 is activated by the CPU 13 to provide an appropriate alarm and display. Thus, an illegal start-up and running of the engine by a wrong key is prevented, thereby ensuring the prevention of a vehicle theft.

The engine starting prevention function and the antitheft function of the above-described transponder type immobilizer are excellent. However, there is a problem that, when the validity of the key used is determined as a result of collation of the key ID code and the reference ID code which responds to turning of the key 2 to the ignition position as described above, since transmission of the enable signal and energizatlon of the starter relay 15 are carried out simultaneously in parallel, the noise (refer to waveform 4 in FIG. 5), which is produced due to the starting up and rotation of the starter motor and fluctuations of the power supply voltage (waveform 5 in FIG. 5) which arise therefrom, is liable to be superposed on the enable signal to be transmitted from the compare unit 13S to the engine ECU 16. Therefore, normal reception and determination of the enable signal by the engine ECU 16 may be disturbed and normal and quick starting and driving of the vehicle may not be carried out even though the starting operation utilizes with the normal right key.

SUMMARY OF THE INVENTION

An object of the present invention is to provide a vehicle antitheft system which enables the engine ECU to certainly receive and determine the enable signal so that starting operation of the vehicle with the normal right key is not hindered when the key ID code read from the key 2 agrees with the reference ID code stored in advance in the immobilizer CPU 13.

The vehicle antitheft system according to the present invention comprises an ID code compare unit which compares a key ID code obtained from, for example, an ignition key with the reference ID code stored in advance in the vehicle and generates an enable code when these ID codes come in a preset relationship (for example, both codes are determined identical), an engine ECU which receives and discriminates the enable signal and enables starting and control of the engine when the enable signal has been determined to be correct, and delay means which is started in response to generation of the enable signal and generates a signal that enables starting of the motor starter after the lapse of a preset time period following generation of the enable signal (for example, at least a time period long enough for the engine ECU to store or collate/identify the enable signal).

A certain preset time (for example, at least a time period necessary for the engine ECU to receive the enable signal from the compare unit of the immobilizer ECU and tentatively store it in the register or a time, necessary to collate/identify the enable code signal for its validity and complete setting of an appropriate flag, that is, a time period necessary for the engine ECU to complete collation/identification of the enable signal) is counted by the delay means, and the starter motor is started after lapse of the above preset time. Therefore, the noise produced upon starting of the starter motor is prevented from being superposed on the enable signal, and collation/identification of the enable signal by the engine ECU is not prevented even with fluctuation of the power supply voltage and can be certainly carried out. Consequently, the vehicle can be started quickly without fail.

DETAILED DESCRIPTION OF THE PREFERRED EMBODIMENT

Figure 1:
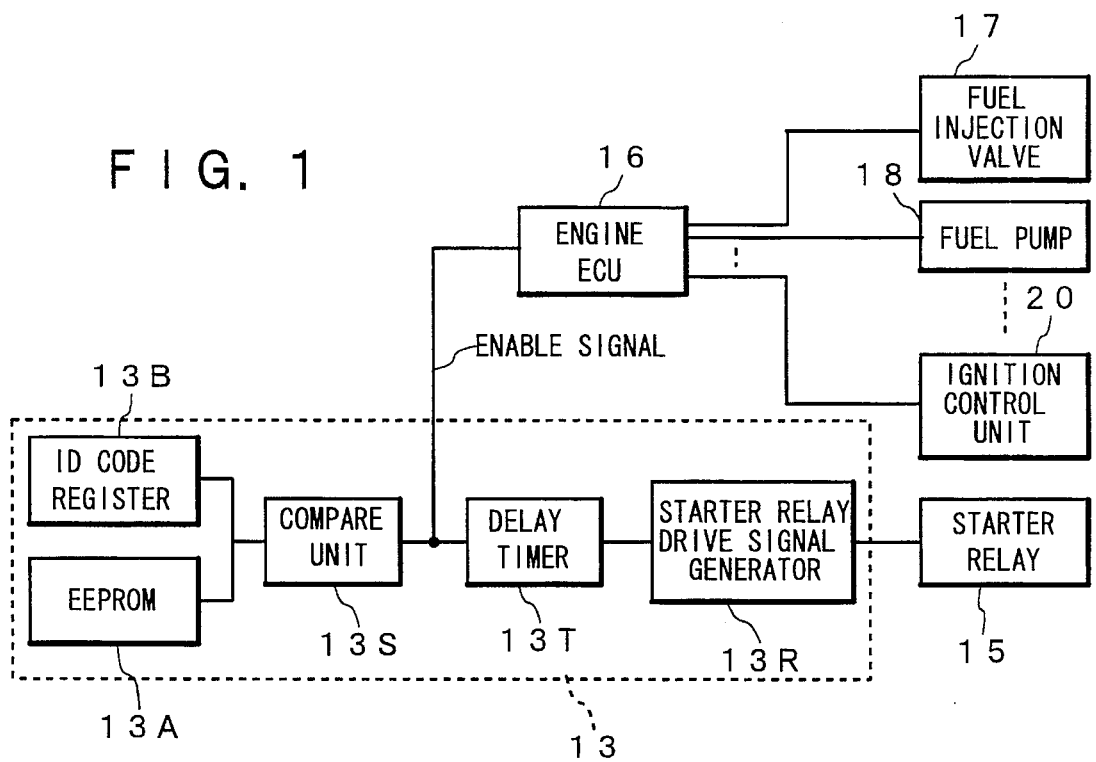
FIG. 1 is a block diagram showing a main part of an embodiment of the present invention.
Figure 2:
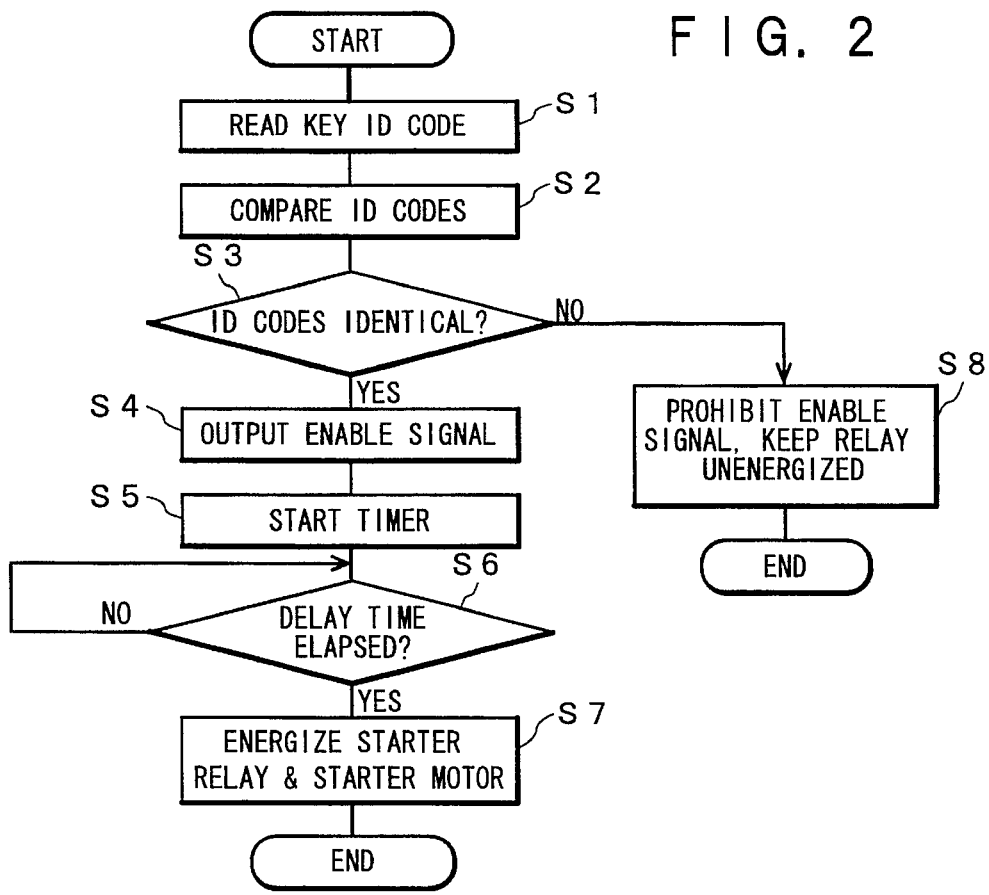
FIG. 2 is a flow chart showing an operation of the embodiment of the present invention.
Figure 3:
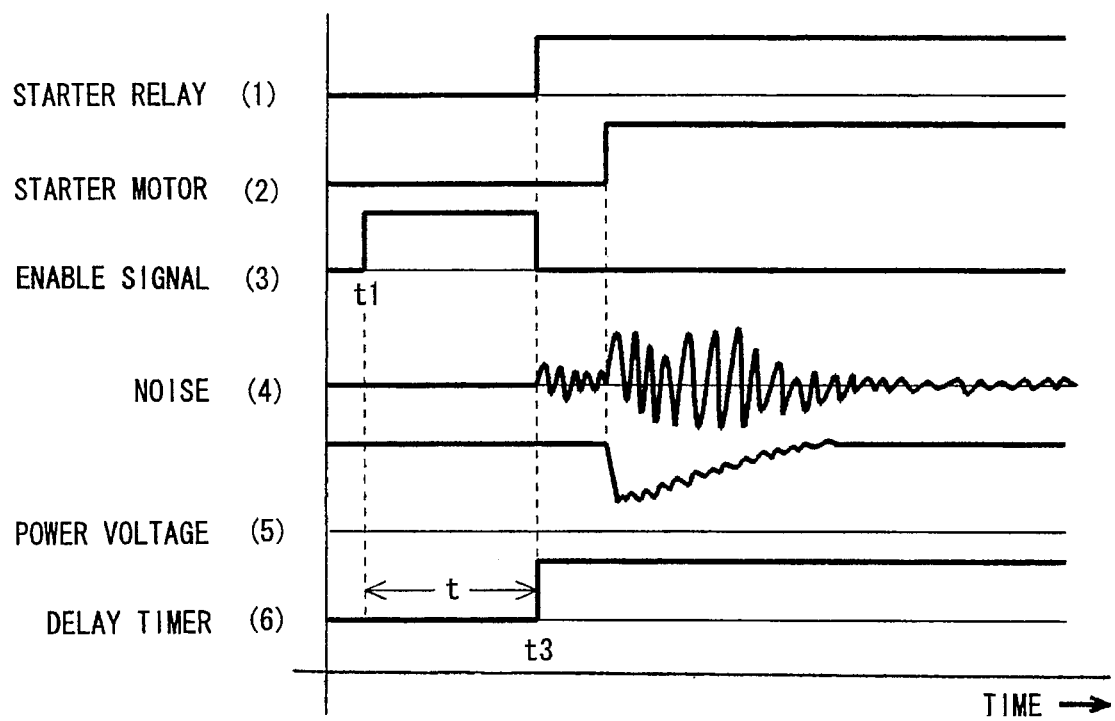
FIG. 3 is a timing chart of the embodiment of the present invention.
Figure 5:
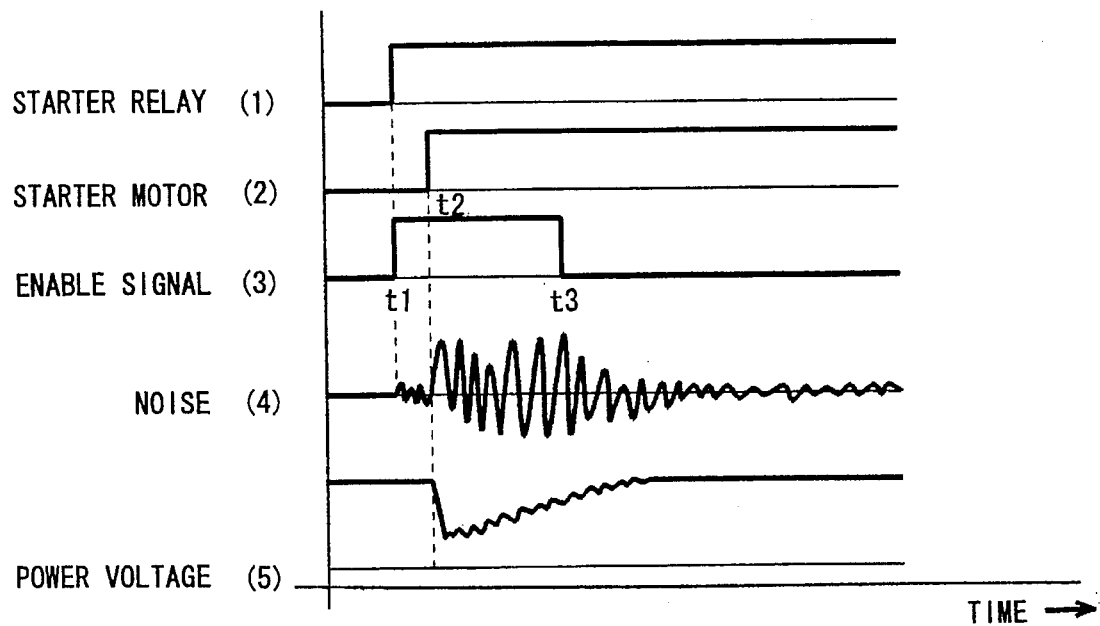
FIG. 5 is a timing chart showing an operation of the device shown in FIG. 4.
Figure 4:
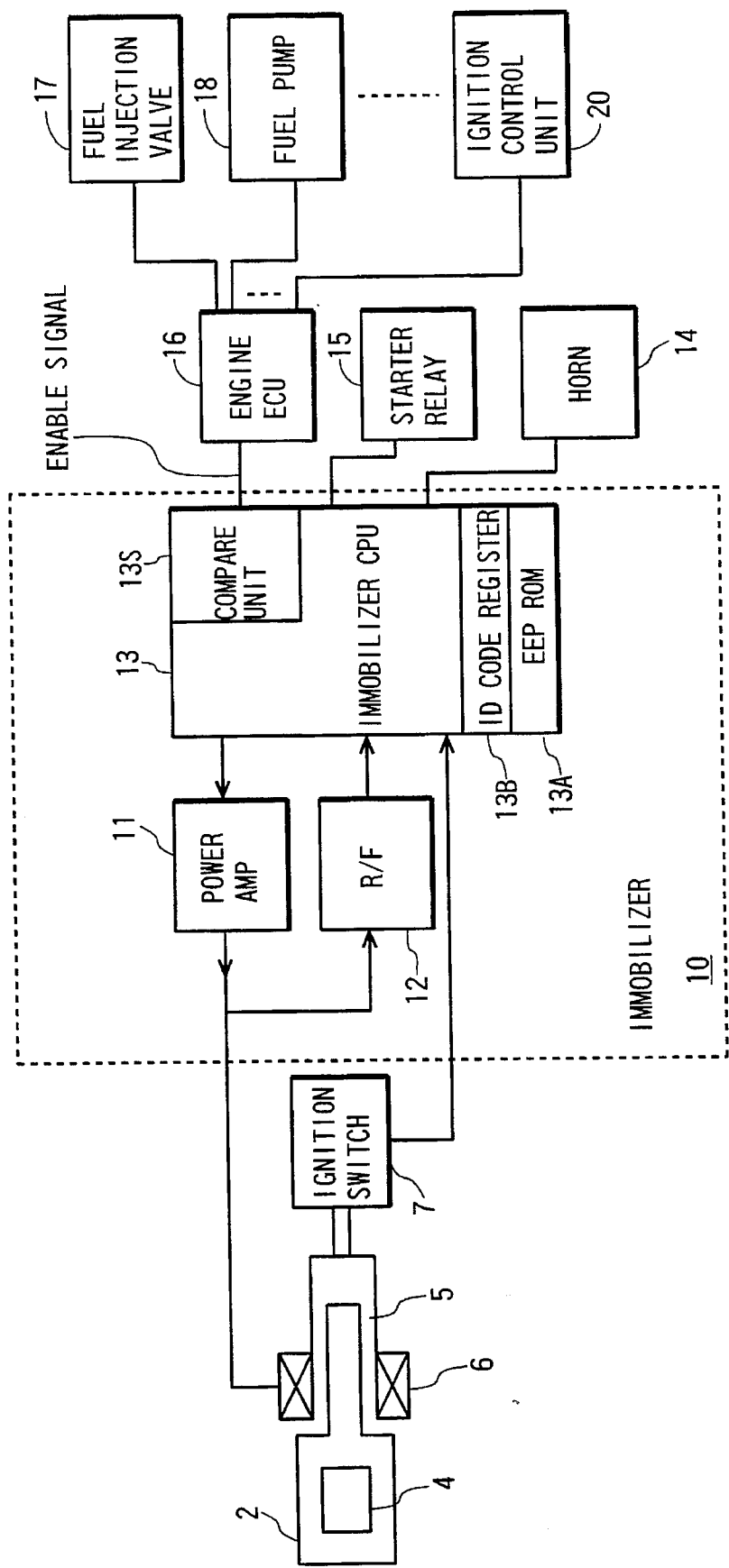
FIG. 4 is a block diagram showing an example of a conventional transponder type immobilizer.

FIG. 1 is a block diagram showing a main part of an embodiment of the present invention and the same reference numerals as in FIG. 4 denote the same or equivalent parts. FIG. 2 is a flow chart showing an operation of the embodiment of the present invention and FIG. 3 is a timing chart of the embodiment of the present invention. When the key ID code transmitted from the key 2 is read by the immobilizer ECU 10 and tentatively stored in the ID code register 13B similarly as in the description with respect to FIG. 4 (step S1 in FIG. 2), the key ID code is compared and collated with the reference ID code stored in advance in the EEPROM 13A of the CPU 13 in the compare unit 13S (step S2).

When the two codes are determined to be identical (step 3), the enable signal is outputted at timing t1 from the compare unit 13S to the engine ECU 16 and the delay timer 13T (step 4). The engine ECU 16 identifies the enable signal and controls the fuel injection valve 17, the fuel pump 18, and the ignition control unit 20 according to the predetermined procedures and timings. On the other hand, the delay timer 13T starts counting of the preset delay time period (step 5). The delay time period is at least the time period necessary for the engine ECU 16 to receive the enable signal and tentatively store it in the register, or a time period necessary to identify the signal as the correct enable signal in a collation procedure and complete setting of an appropriate flag (not shown), that is, a time period necessary for the engine ECU 16 to complete collation/identification of the enable code signal.

When the delay time period has elapsed (step 6), a starter relay drive signal generator 13R generates a further signal to energize the starter relay 15 at timing t3, the starter motor (not shown) is started (step 7), and the processing is completed. On the other hand, if the two ID codes are not identical in collation in step 3, the key used is determined as illegal, the enable signal is not generated (step 8) and therefore the starter relay 15 remains unenergized and processing is finished.

Though the delay timer 13T delays the enable signal for at least a time period necessary for the engine ECU 16 to complete collation/identification of the enable signal in the above description, since it is obvious that the noise produced is particularly large upon starting of the starter motor but the noise generated by the starter relay is relatively small, a reasonable noise suppressing effect can be obtained even if the delay is shorter than the above-mentioned time period.

It is also easily understood that the present invention can apply not only to the transponder type immobilizer, which is described in the embodiment, but also to any other vehicle antitheft systems which are adapted to generate the enable signal to permit starting of the engine and driving of the vehicle after checking the validity of the key ID code through comparison and collation of the key ID code and the reference ID code.

According to the present invention, starting of the starter motor in response to the enable signal is delayed to be later than the response of the engine ECU 16 to the enable signal and therefore, the degree of hindrance due to noise produced from rotation of the starter motor is reduced in identification and determination of the enable signal by the engine ECU 16. Particularly, if the delay time period is set to at least a time period necessary for the engine ECU 16 to complete receiving the enable signal from the compare unit 13S of the immobilizer ECU 10, tentatively storing it in the register, identifying the enable signal for its validity and setting of an appropriate flag (not shown), that is, a time period necessary for the engine ECU to complete collation/identification of the enable signal, the noise produced along with starting of the starter motor is prevented from being superposed on the enable signal. Therefore, the collation/identification of the enable signal by the engine ECU is not actually hindered even with such noise and/or fluctuation of the power supply voltage, but can be certainly carried out. Consequently, the vehicle can be started quickly without fail while maintaining the vehicle antitheft function. An expensive shielded wire is not required to be used for a signal transmitting wire to the engine ECU 16 from the immobilizer CPU 13.

What is claimed is:

1. A vehicle antitheft system comprising, in a vehicle:

motor starter means;

an ID code compare unit which compares a key ID code with a reference ID code stored in advance in said vehicle and generates an enable signal when said ID codes are in a preset relationship to one another;

an engine ECU which receives and identifies the enable signal, said engine ECU being operative to generate an output signal which activates components in said vehicle other than said starter means when the enable signal has been determined to be correct; and delay means which generates a further signal used to activate said motor starter means after lapse of a preset time period subsequent to generation of the enable signal.

2. A vehicle antitheft system according to claim 1, wherein said preset time period is at least long enough for the engine ECU to store the enable signal before said motor starter means is activated by said further signal.

3. A vehicle antitheft system according to claim 1, wherein said preset time period is at least long enough for the engine ECU to complete identifying the enable signal before said starter motor means is activated by said further signal.

4. A vehicle antitheft system according to claim 1 in which said delay means comprises a timer for measuring said preset time period, the operation of said timer being initiated by generation of said enable signal, said timer having an output coupled to a signal generator which generates said further signal after the lapse of said preset time period.

5. The vehicle antitheft system according to claim 4, wherein said further signal controls a relay in said motor starter means.

* * * * *